United States Patent
Yasuda et al.

(10) Patent No.: US 6,338,095 B1
(45) Date of Patent: Jan. 8, 2002

(54) DATA TRANSFER METHOD FOR REDUCED NUMBER OF MESSAGES BY MESSAGE PASSING LIBRARY AND DIRECT INTERMEMORY DATA TRANSFER LIBRARY AND COMPUTER SYSTEM SUITABLE THEREFOR

(75) Inventors: Yoshiko Yasuda; Hiroaki Fujii, both of Tokorzawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/177,496

(22) Filed: Oct. 23, 1998

(30) Foreign Application Priority Data

Oct. 23, 1997 (JP) .............................................. 9-290597

(51) Int. Cl.<sup>7</sup> ............................................. G06F 15/16
(52) U.S. Cl. ...................... 709/250; 709/226; 709/223; 709/224; 709/238; 370/351; 710/3
(58) Field of Search .......................... 340/827; 709/226, 709/223, 224, 225–237, 250, 245, 238; 370/351; 710/3

(56) References Cited

U.S. PATENT DOCUMENTS 5,659,777 A * 8/1997 Iwasaki et al. ............. 709/226
5,982,296 A * 11/1999 Wakasa et al. .............. 340/827
6,038,607 A * 3/2000 Hamilton et al. ........... 709/236

* cited by examiner

Primary Examiner—Ayaz Sheikh
Assistant Examiner—Tammy Lee
(74) Attorney, Agent, or Firm—Antonelli, Terry, Stout & Kraus, LLP

(57) ABSTRACT

A computer system including a plurality of element processors, and an interconnecting network for connecting the element processors. Each element processor includes a processor, a memory, and a network interface circuit for exchanging messages with the interconnecting network. Each element processor is provided with a message passing library for communicating with user processes running therein and a direct inter-memory data transfer library for communicating with the message passing library and controlling the network interface circuit. The network interface circuit includes a memory read circuit connected to the memory, and a message assembly circuit connected to to memory read circuit for generating a message to be transferred to a destination element processor through said interconnecting network. The memory read circuit reads user data to be transferred and additional information which is to be used in the destination element processor to identify whether the user data is requested by a user process running in said destination element processor based on first and second pieces of address information. The message assembly circuit generates a message which includes a header and send data which includes the user data and the additional information.

13 Claims, 7 Drawing Sheets

DATA TRANSFER METHOD FOR REDUCED NUMBER OF MESSAGES BY MESSAGE PASSING LIBRARY AND DIRECT INTERMEMORY DATA TRANSFER LIBRARY AND COMPUTER SYSTEM SUITABLE THEREFOR

BACKGROUND OF THE INVENTION

This invention relates to a data transfer method between plural element processors connected through an interconnecting network and a computer system suitable therefor.

A conventional parallel computer system often has structure that plural element processors each of which includes a local memory and an instruction processor are connected by an interconnecting network. In general, the parallel computer system of this type is called as a parallel computer system of a distributed memory type. Each element processor exchanges data stored in its local memory with other element processors by way of the interconnecting network and executes processing in parallel with each other.

In the parallel computer system of the distributed memory type, data transfer is generally achieved by using the programming model called message passing. In the message passing model, a sending (SEND) procedure and a receiving (RECEIVE) procedure are described explicitly in the parallel program (which is called as a user process hereinafter) executed in each element processor. The element processor of the sending side transfers a message which contains send data designated by a send procedure (SEND) when the procedure has been executed. The element processor of the receiving side receives the message when a receive procedure has been executed. The instruction processor in each element processor analyzes these communication procedures included in the user process under execution, and advances the processing by transferring data to the interconnecting network or receiving data therefrom. The element processor of the sending side designates the number of the destination element processor and transfers the message. Some specific data transfer methods are proposed by which each element processor actually processes the data send request and the data receive request from such a user process. From a practicable viewpoint, it is preferable that the extra processing (send overhead) executed from issuing of the send request by the user process of the sending side till the start of transferring of the user data and the extra processing (receive overhead) executed from issuing of the receive request by the user process of the receiving side till handing over of the data to the user process are small.

Recently the following data transfer method is used in many plural parallel computer systems, in order to reduce the send overhead and the receive overhead. The send/receive circuit of the element processor of the sending side directly read user data to be sent from a region for a user process provided in the local memory, and transfers the user data and generates a message which contains the user data. The send/receive circuit in the element processor of the receiving side directly writes the user data within the message into a region provided for a user process of the receiving side within the local memory. There are some specific methods for achieving such data transfer, but, in the present specification, those data transfer methods are generically called as a direct inter-memory data transfer method.

Specific examples of the communication method for executing the method are the PUT communication method for transferring send data to another element processor and GET communication method for receiving data from another element processor. For instance, refer to "Proceedings of Information Processing Society of Japan Parallel Processing Symposium JSPP '95" and PP. 233–240 (May, 1995) or refer to a manual "HI-UX/MPP Remote DMA User's Guide -C-" published by the present assignee for a parallel computer system SR2201 developed thereby. The PUT communication method is called as a direct remote memory access method in this manual.

To be specific, in the PUT communication method, the instruction processor in the element processor of the sending side notifies the send/receive circuit of an address (send data address) of the local memory of the sending side to read the send data, an address (receive data address) of the local memory of the receiving side to write the send data, and some other addresses. The send/receive circuit of the sending side reads the user data from the local memory based on the send data address, generates a message which contains the user data, the receive data address, and other addresses, and transfers the message. The send/receive circuit of the receiving side writes the user data within the message into the local memory in the element processor of the receiving side according to the receive data address in the message. Thus, in the PUT communication method, the send/receive circuit of the sending side directly accesses the local memory of the sending side according to the send data address and the send/receive circuit of the receiving side directly accesses the local memory of the receiving side according to the receive data address. Other communication methods which differ from such a PUT communication method but execute similar processing will be called below as a PUT communication method or a remote memory directly access method. The PUT communication method will be discussed below as a representative method of the direct inter-memory data transfer method, when the latter method is to be discussed.

In direct inter-memory data transfer method, the send/receive circuit which generates or receives a message may directly read the send data from a region for a user process in the local memory of each element processor or writes the received data into a region for a user process in the local memory. So, in the element processor of the sending side, the send data does not need to be copied from a region for a user process onto a buffer area (controlled by the Operating System), and in the element processor of the receiving side, the received data need not be copied from a buffer area (controlled by the Operating System) onto a region for a user process, either. Therefore, in this communication method, the send overhead and the receive overhead which derive from the copy can be reduced.

The communication library which executes the direct inter-memory data transfer method of such as the PUT communication or the GET communication and so on is developed by each parallel computer system maker or a research organization as a library specific to them. So, it is difficult to port the parallel programs programmed so as to use the library to other machines. On the other hand, a library (message passing library) with a standard interface specification to use the message passing model between user programs has come in use. It is possible to run such a parallel program programmed so as to use the library on different computers equipped with the library without change. The representative of that interface specification is MPI (Message Passing Interface). Universities in the United States of America and parallel computer system makers has organized the Message Passing Interface Forum (MPI Forum), and MPI is specification decided by the forum as a result of the research. It is expected that the library produced based on the specification will become a main current of the parallel program development support libraries in the future. Hereinafter, the library will be called as the MPI library.

In order to execute a data send request or a data receive request issued from a user process to the MPI library at high speed, it is effective to execute those request by using the direct inter-memory data transfer method like the PUT communication method and so on. Thus, parallel computer system makers and so on have developed MPI libraries to execute the send request or the receive request from the user process, by using the direct inter-memory data transfer library such as the PUT communication library. For instance, such a MPI library is used in the parallel computer system SR2201 developed by the assignee of the present application. The MPI library of this kind responds to the data send request or the data receive request from the user program, issues a suitable command to the PUT communication library, and requests execution of the transfer or receive operation requested by the user process. The PUT communication library orders transfer of a message to the network interface circuit which includes a message send/receive circuit. The communication method which processes the data send request or the data receive request issued from the user process to a MPI library by using a direct inter-memory data transfer library such as a PUT communication library may be called below as a communication method of using these two libraries or using the two libraries together or using combination of these two libraries. The MPI specification does not defines the specification concerning the interface between the MPI library and the direct inter-memory data transfer library such as the PUT communication library. Therefore, the MPI library to use the direct inter-memory data transfer library such as the PUT communication library together is different depending upon each computer maker. However, the interface between a user program and a MPI library is the same with any MPI library produced by any computer maker. Therefore, the user program can run on a computer by any maker as far as it is installed with a MPI library, and a data send request from the user program will be processed at a high-speed by the data transfer by direct inter-memory data transfer library such as the PUT communication library.

When the user program directly uses the PUT communication library without using the MPI library together, the user program should designate information necessary for an operation of the data send/receive circuit, such as an address of a memory where the user data to be transferred exists and the length of the user data as arguments of a call sentence to the PUT communication library. When the user program uses the MPI library for data transfer, the user program should designate the additional information, in addition to the two arguments designated for the PUT communication library, as arguments of a call sentence to the MPI library. The additional information includes information necessary for processing data send/receive protocol defined by the MPI specification. The additional information includes plural pieces of information of plural kinds predetermined by the MPI library. Specifically, the additional information is data of fixed length and contains the identifier of the destination process and the process group identifier and so on. The additional information is used in the destination element processor of the message to identify whether the message is one requested by a receive request issued by a user process under execution. The additional information may be called below as the MPI additional information.

In the conventional parallel computer system which uses a direct inter-memory data transfer library such as a PUT communication library together with a MPI library, the user data and the MPI additional information designated by a send request issued by a user process were transferred by two different messages. That is, in the element processor of the sending side, the MPI library notifies the PUT communication library of information necessary for transfer of the user data and requests the PUT communication library to generate transfer control information which contains plural pieces of information, based on those notified information. The put communication library generates the transfer control information, writes it into the local memory, and requests the network interface circuit to execute data transfer according to the transfer control information. The network interface circuit read the transfer control information from the local memory, read the send data from the local memory according to the send data address in the transfer control information, and generates and transfers a message which contains the data. In addition, the network interface circuit writes the send completion flag into the local memory according to the send data flag address in the transfer control information. The MPI library, the PUT communication library and the network interface circuit execute the above-mentioned processing to the MPI additional information also. In the element processor of the receiving side, the network interface circuit, the PUT communication library, and the MPI library processes a receive request issued by the user process of the receiving side based on the two transferred messages.

When the user data and the MPI additional information are transferred to the same destination processor in a form of two messages like the prior art, different pieces of transfer control information are needed for transfer of each message. As a result, it is necessary to generate the transfer control information twice. Therefore, the delay time (called transfer latency) from requesting by a user program, transfer of data till start of the transfer is large in the conventional data transfer using a MPI library.

In addition, the send processing and the receive processing are executed to each of these two messages in the processor element of the sending side and in the processor element of the receiving side, respectively. So, the access frequency to the local memory in these processor elements increases in proportion to the number of the messages. For instance, the element processor of the sending side needs to execute the operations such as reading of the transfer control information, reading of data to be transferred, and writing of a send completion flag for each message.

SUMMARY OF THE INVENTION

The object of the present invention is to provide a data transfer method which can decrease the above-mentioned problems and transfer data at a higher speed, and a computer system suitable therefor.

A more concrete object of the present invention is to provide a data transfer method which can transfer both user data and additional information which a user process of the sending side designate, and a computer system suitable therefor.

To achieve those objects, in a computer system according to the present invention, a network interface circuit in each element processor is provided with a memory read circuit connected to the memory in the element processor and connected to the memory read circuit which generates a message which should be transferred to the interconnecting network. The memory read circuit reads the first data and the second data both to be transferred from the memory, based on the first and second pieces of address information designated by the processor in the element processor. The message assembly circuit generates a message which comprises a header and send data which includes both the first data and the second data. Therefore, each element processor can transfer plural data at a higher speed than the conventional apparatus.

A data transfer method according to the present invention is achieved by using a network circuit which has the function to generate a message which contains plural data as send data, just like the network circuit mentioned above.

That is, first and second pieces of address information and other information are generated by cooperate between a message passing library and a direct inter-memory data transfer library provided in an element processor of a sending side, in response to a data send request issued by a user process of a sending side running in said element processor of a sending side;

wherein the data send request designates user data and additional information to be transferred, and data length information for the user data;

wherein the first and second pieces of address information designate two storage regions within the memory of the element processor of a sending side where said user data and said additional information are stored;

wherein the additional information comprises a plurality of pieces of information each of which is of one of a plurality of kinds predetermined by the message passing library of a sending side and relates to transferring of the user data to a user process of a receiving side running in the element processor of a receiving side;

wherein the other information comprises a plurality of pieces of information each of which is of one of a plurality of kinds predetermined by the direct inter-memory data transfer library and relates to transferring of the user data and the additional information to the element processor of a receiving side.

The network interface circuit reads the user data and the additional information from the memory of the element processor of a sending side, based on the first and second pieces of address information.

The network interface circuit further assembles a message send data of which includes the user data and the additional information, and a header of which includes the other information and the data length information.

The network interface circuit transfers the message to the element processor of a receiving side by way of the interconnecting network.

In a more specific embodiment of the present invention, the user process not only can use the above mentioned data transfer which uses both the message passing library and the message passing library, but also can issue a data send request directly to the direct inter-memory data transfer library. In the latter case, the direct inter-memory data transfer library and the network interface circuit execute processing basically the same to the above-mentioned processing except that the additional information does not exist.

DESCRIPTION OF THE EMBODIMENTS

Figure 1:
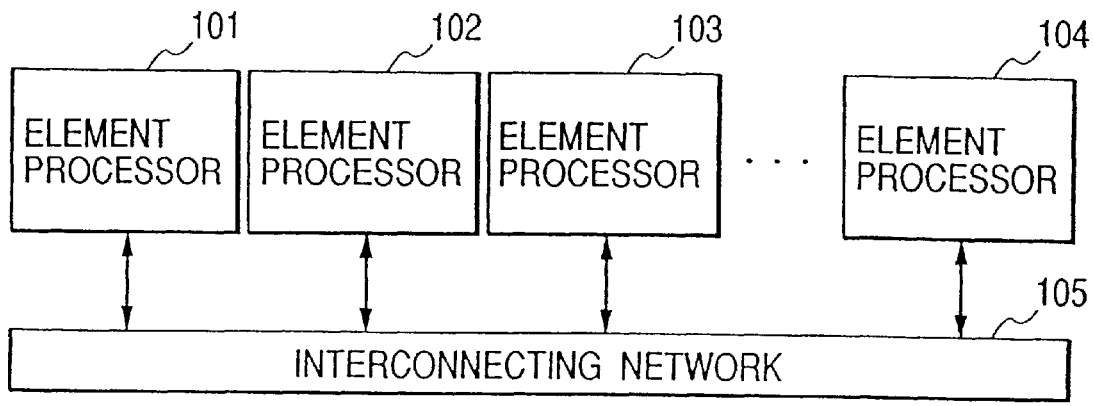
FIG. 1 shows a block diagram of a parallel computer system according to the present invention.

A computer system according to the present invention will be explained in more detail with reference to one or several embodiments or their modifications shown in the drawings.

FIG. 1 shows schematic structure of a parallel computer system according to the present invention. In the drawing, the reference numerals 101–104 show element processors, which compose the parallel computer system, and 105 shows an interconnecting network. The element processor 101–104 are connected to the interconnecting network 105 and exchange data with other element processors through the interconnecting network 105. There are various kinds of structure (topology) for the interconnecting network such as crossbar interconnection, lattice interconnection, ring interconnection, and multistage interconnection and so on. The present invention is not limited to an interconnecting network of a specific S but can be applied to an interconnecting network of any of these kinds of S.

Figure 3:
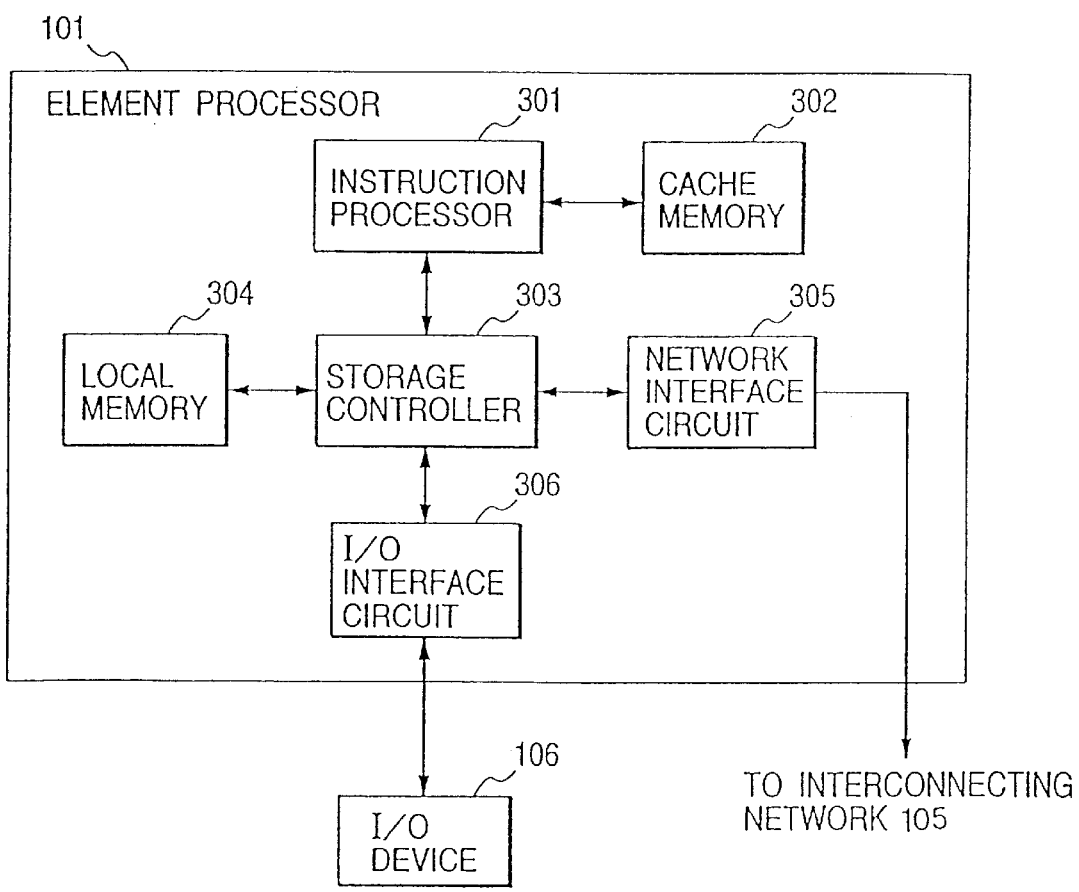
FIG. 3 shows a block diagram of an element processor used in the apparatus shown in FIG. 1.

FIG. 3 shows schematic structure of the element processor 101 , , , or 104. In the figure, 301 shows an instruction processor, 302 shows a cache memory, 303 shows a storage controller, 304 shows a local memory, 305 shows a network interface circuit, 306 shows an I/O interface circuit and 106 shows an I/O device. The I/O device 106 is not shown in FIG. 1 for simplification. The I/O device 106 does not need to be installed in all of the element processors 101 to 104. The parallel computer system is one of a distributed local memory type where each element processor has a local memory 304 of its own.

Each element processor is composed so as to execute communication with other element processors by message passing. That is, each element processor includes a message passing library which has a standard message passing interface, MPI for instance, (which may be called as a MPI library hereinafter), a library which communicates with the MPI library and executes PUT/GET communication (which may be called as a PUT/GET library hereafter) and the network interface circuit 305 invoked by the PUT/GET library. The PUT/GET library is installed as a library for executing direct inter-memory data transfer which directly transfers data with the local memory in the element processor where the library is installed. The present invention is not limited to this specific message passing library but other message passing libraries can be applied such as PVM (Parallel Virtually Machine) proposed by Oak Ridge National Laboratory, Inc. and PARMACS proposed by PALLAS company. Moreover, the PUT communication library that executes only the PUT communication can be used in place of the PUT/GET communication library. It is needless to say that other library can be used as a library for executing direct inter-memory data transfer, in place of the PUT/GET communication library or the PUT communication library.

In the present embodiment, when a user process in each element processor issues a data send request to the MPI library, the MPI library and the PUT communication library decide by cooperation in response to the data send request, plural pieces of address information and other information. The pieces of address information are used to read the user data and the MPI additional information, and the other information is information to be transferred to the element processor of the receiving side together with the user data and the MPI additional information. The network interface circuit 305 read the user data and the MPI additional information based on these pieces of address information from the local memory and transfers these data and the other information in one message. In addition, when a message which contains user data and MPI additional information is received from another element processor, the network interface circuit 305 writes these two data in the local memory 304 separately. The additional information is used for communication through the MPI library. It comprises plural pieces of information which relate to transferring of data and are of the kinds designated by the MPI library. Each of the plural pieces information is designated by the user process. Specifically, the additional information contains the identifier of the user process of the receiving side and the process group identifier and so on, as illustrated already.

More specifically, when a data send request command is issued from a user process of the user being executed in an element processor to the MPI library, the MPI library requests the PUT/GET communication library to store the MPI additional information. The PUT/GET communication library stores the information designated by the command into a communication region within the local memory predetermined as one directly accessible by the network interface circuit 305. The MPI library requests the PUT/GET communication library to generate transfer control information. The PUT/GET communication library generates transfer control information for transfer of both the user data and the additional information in one message, and writes it into the local memory 304. The transfer control information contains two pieces of address information about two storage locations of the destination local memory at which the user data and the additional information are to be written, and other address information. Thereafter, the PUT/GET library request the network interface circuit 305 to transfer the user data and the additional information, based on the transfer control information. Then, the MPI library requests the PUT/GET communication library to start the transfer based upon the transfer control information. The PUT/GET communication library requests the network interface circuit 305 to execute the requested transfer. If the user data is located at a location within the local memory 304 which the network interface circuit 305 cannot access directly, the PUT/GET communication library copies the user data into a location within the communication area within the local memory.

The network interface circuit 305 responds to this command from the PUT/GET communication library, and assembles, according to the transfer control information, one message which contains the user data and the MPI additional information, and transfers the message to the element processor of the receiving side through the interconnecting network 105. The header of the message contains two pieces of address information and other information. The two pieces of address information designate the two locations in the destination local memory where the user data and the additional information in the message are to be written, respectively. When the network interface circuit 305 in the element processor of the receiving side receives the message, it writes the user data and the additional information into two regions of the local memory, based upon the two pieces of address information included in the header of the message, and delivers them over to the user process and the MPI library of the receiving side, respectively.

Figure 2:
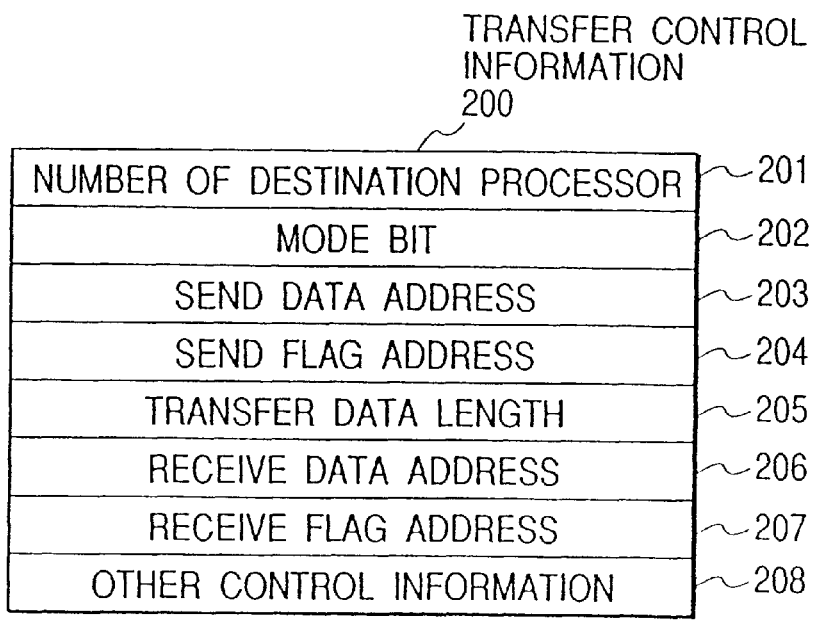
FIG. 2 shows an example of transfer control information used in the apparatus shown in FIG. 1.

FIG. 2 shows an example of the transfer control information. The transfer control information 200 contains plural pieces of information used at the PUT or GET operation, and the kinds of these pieces of information are predetermined by the PUT/GET communication library. To be more specifically, in the present embodiment, the transfer control information 200 includes the number of the destination processor 201, the mode bit 202, the send data address 203, the send flag address 204, the transfer data length 205, the receive data address 206, the receive flag address 207, other information 208 necessary for communication processing, and so on. The send data address 203 is the start address of the local memory region where the user data to be transferred at the PUT operation is stored. The transfer data length 205 is the length of data (user data) transferred at PUT or GET operation. The receive data address 206 is the start address of the local memory region into which the user data in the received message is written, within the element processor of the receiving side.

The mode bit 202 is a bit which shows whether use of the send flag address field 204 is expanded according to the embodiment. That is, the mode bit 202 is set to one in the transfer control information generated when the user program uses the PUT/GET communication library via the MPI library. On the other hand, the mode bit 202 is reset to 0 in the transfer control information generated when the user program directly uses the PUT/GET communication library. When the mode bit 202 is not set, the send flag address 204 designates the location of the local memory of the element processor of the sending side where the send completion flag is to be written at completion of the transfer of the user data at the message sending operation in the element processor of the sending side of the message. Similarly, the receive flag address 207 is the address of the location of the local memory of the element processor of the receiving side into which the receive completion flag corresponding to the user data is written at completion of the receipt of the user data transferred at the message receiving operation in the element processor of the receiving side of the message. However, when the mode bit 202 is set to one, the send flag address field 204 is used to designate the start address of the region of the local memory of the element processor of the sending side from which the MPI additional information should be read at the message sending operation in the element processor of the sending side of the message. Similarly, the receive flag address field 207 is used to designate the start address of the region of the local memory of the element processor of the receiving side at which the MPI additional information included in the received message should be written at the message receiving operation in the element processor of the receiving side of the message.

As a result, the local memory address where the send completion flag should be written is not designated explicitly by the transfer control information 200 at the message sending operation in the element processor of the sending side of the message. In the present embodiment, the network interface circuit 305 of the element processor of the sending side adds the predetermined size of the MPI additional information to the address of in the send flag address field 204 and writes the send completion flag common to the user data and the MPI additional information into the location of the local memory, having the address obtained as a result of the addition. Similarly, the network interface circuit 305 of the element processor of the receiving side adds the predetermined size of the MPI additional information to the address of in the receive flag address field 207 and writes the receive completion flag common to the user data and the MPI additional information included in the received message, into the location of the local memory, having the address obtained as a result of the addition, at the message receiving operation in the element processor of the receiving side of the message. As a result, two kinds of data, that is, the user data and the MPI additional information can be transferred or received in one message by using one transfer control information 200, and yet the send completion flag or the receive completion flag required in execution of the PUT operation can be written into the local memory of the element processor of the sending side and the local memory of the element processor of the receiving side, respectively.

The instruction processor 301 is a unit which executes program processing. The cache memory 302 is a memory which accompanies the instruction processor 301 and has a relatively high speed and a relatively small capacity. The network interface circuit 305 is a unit which is connected to the interconnecting network 105 and executes data transfer processing according to the commands from the instruction processor 301. The data transfer processing is executed independently of the program processing in the instruction processor 301, which is the characteristic of the parallel computer system of the distributed memory type. The storage controller 303 accesses suitable storage medium according to a data access request issued from the instruction processor 301, the network interface circuit 305, or the I/O interface circuit 306. The local memory 304 stores data and so on under control by the storage controller 303. The instruction processor 301 and the network interface circuit 305 operate independently from each other, so the storage controller 303 processes an access request to the local memory 304 required by data transfer from the network interface circuit 305, in parallel to processing of the access request to the local memory 304 from the instruction processor 301. The I/O interface circuit 306 accesses the I/O device 106 according to an access request from the storage controller 303. In an element processor to which the I/O device 106 is not added, the I/O interface circuit 306 may not exist.

Figure 4:
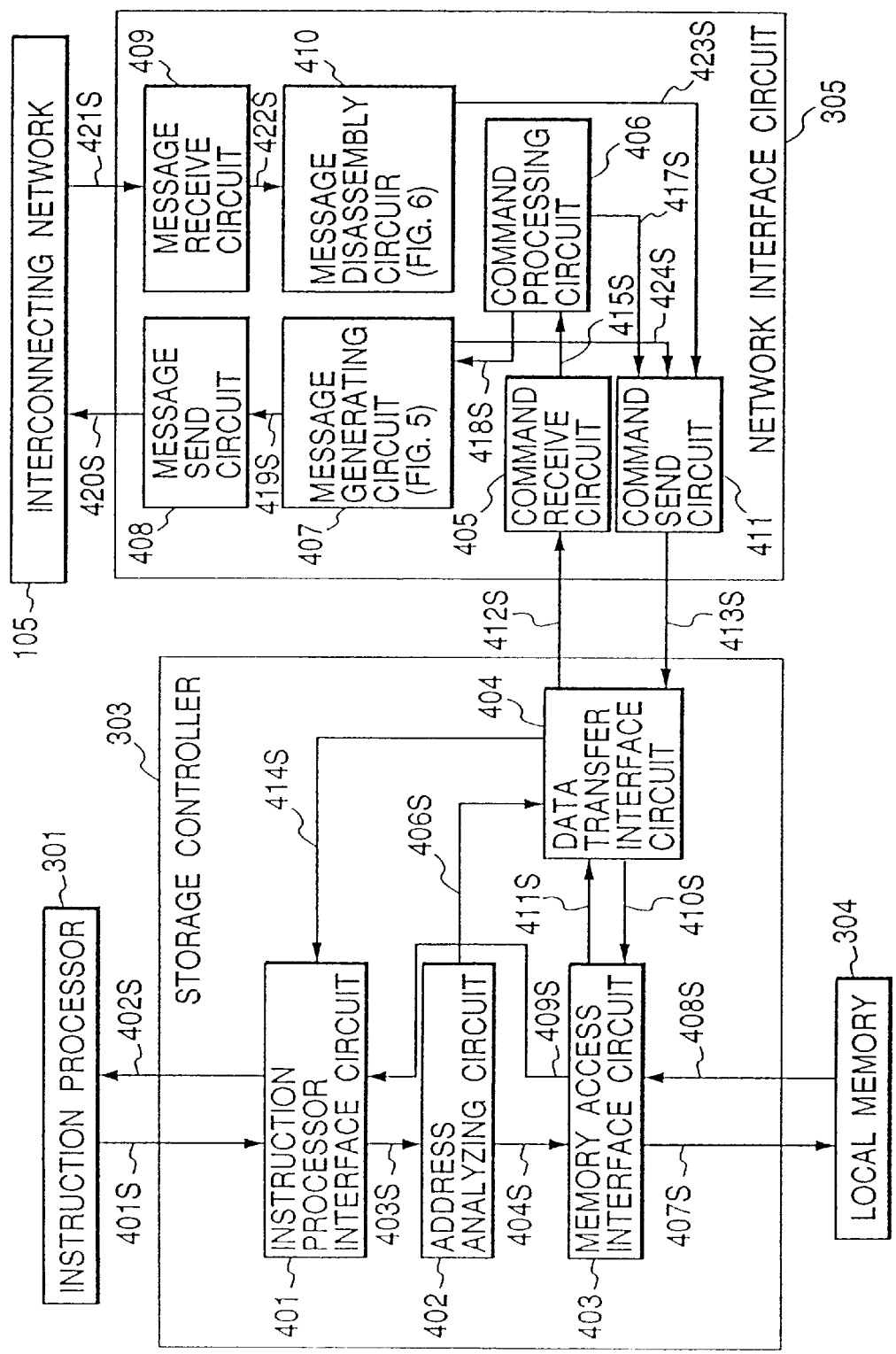
FIG. 4 shows a block diagram of the storage controller and the network interface circuit used in the element processor shown in FIG. 3.

As shown in FIG. 4, the storage controller 303 is composed of the instruction processor interface circuit 401, the address analyzing circuit 402, the memory access interface circuit 403 and the data transfer interface circuit 404. The instruction processor interface circuit 401 receives a transaction such as an access request to the local memory 304 or a command which should be sent to the network interface circuit 305, from the instruction processor 301 by line 401S. The command is usually an access request to one of the control registers (not shown in the drawings) in the network interface circuit 305. The instruction processor interface circuit 401 transfers to the instruction processor 301 through line 402S, an response to the transaction generated by the memory access interface circuit 403 or the network interface circuit 305 or an interrupt transfer request which requests transfer of the interrupt factor detected by the storage controller 303 or the network interface circuit 305. The response to the transaction of the access request to the local memory 304 is data read therefrom.

The address analyzing circuit 402 receives by line 403S, the local memory access request or a command to be sent to the network interface circuit 305, both issued by the instruction processor 301, and analyzes the destination address which the access request or the command designates. The address analyzing circuit 402 transfers the local memory access request to the memory access interface circuit 403 through line 404S and the command which should be sent to the network interface circuit 305 to the data transfer interface circuit 404 through line 406S.

The memory access interface circuit 403 receives the local memory access request from the address analyzing circuit 402 through line 404S and transfers it to the local memory 304 through line 407S. When the local memory access request is a read request to the local memory, the data which the read request designates is transferred from the local memory 304 to line 408S. In addition, the read data is transferred from the memory access interface circuit 403 to the instruction processor interface circuit 401 through line 409S, and is further transferred to the instruction processor 301 through line 402S. The memory access interface circuit 403 also processes a local memory access related to inter-processor data transfer. A request for the local memory access related to the inter-processor data transfer is transferred from the network interface circuit 305 through the data transfer interface circuit 404 and line 410S. The memory access interface circuit 403 issues the local memory access request transferred from the network interface circuit 305 to the local memory 304 like a local memory access request transferred from the instruction processor 301. When the access request is a read access, the memory access interface circuit 403 transfers data read out from the local memory 304 back to the network interface circuit 305 via line 411S and the data transfer interface circuit 404.

The data transfer interface circuit 404 receives a command which should be transferred to the network interface circuit 305 as transferred from the address analyzing circuit 402 through line 406S, and transfers it to the network interface circuit 305 through line 412S. A response to the command or a local memory access request related to the inter-processor data transfer is transferred to the data transfer interface circuit 404 from the network interface circuit 305 through line 413S. The data transfer interface circuit 404 transfers the response to the above-mentioned command to the instruction processor interface circuit 401 through line 414S, and to the instruction processor 301 through line 402S. The data transfer interface circuit 404 transfers the local memory access request to the memory access interface circuit 403 through line 410S. When the access request is a read request, the data read from the local memory 304 is transferred from the memory access interface circuit 403 to the data transfer interface circuit 404 through line 411S and is further transferred from the data transfer interface circuit 404 to the network interface circuit 305 through line 412S. The data transfer interface circuit 404 occasionally receives from the network interface circuit 305, an interrupt transfer request generated therein through line 413S. The interrupt transfer request is transferred to the instruction processor interface circuit 401 through line 414S and is further transferred to the instruction processor 301.

The network interface circuit 305 is composed of the command receive circuit 405, the command processing circuit 406, the message generating circuit 407, the message send circuit 408, the message receive circuit 409, the message disassembly circuit 410, and the command send circuit 411. The command receive circuit 405 receives a command which requests an access to a control register (not shown in the drawings) within the network interface circuit 305 from the storage controller 303 through line 412S, the data requested by the network interface circuit 305 and read from the local memory 304, and so on. The read data is transferred to the command processing circuit 406 through line 415S.

The read data is, for example, data which should be transferred to another element processor, data to be set in the control register (not shown in the drawings) within the network interface circuit 305 as operation control data therefor, or the transfer control information used to generate a message at transfer of data. The transfer control information contains the number of the destination processor, the send data address, the send flag address, the transfer data length, the receive data address, and the receive flag address and so on.

The command processing circuit 406 executes the command which requests access to a control register in the network interface circuit 305 (not shown in the drawing) and is transferred from the command receive circuit 405 through line 415S. When the access is a read access, the command processing circuit 406 executes the read access and transmits data as read from the local memory 304 to the command send circuit 411 through line 417S. When the access is a write access, the command processing circuit 406 executes writing requested by the command. When the access to the control register is a write request to the control register (not shown in the drawing) for invocation of the message transfer, the network interface circuit 305 starts message send processing. In the message send processing, the command processing circuit 406 generates a local memory access request for readout of the transfer control information 200 stored in the local memory 304, to get the local memory address of a location where information required to produce the header of the message and transfer data is stored. The access request is transferred to the command send circuit 411 through line 417S, is further supplied to the local memory 304 through line 413S, the data transfer interface circuit 404, line 410S, the memory access interface circuit 403, and line 407S, and the transfer control information is read from the local memory 304. The read transfer control information is transferred to the message generating circuit 407 via line 408S, the memory access interface circuit 403, line 411S, the data transfer interface circuit 404, line 412S, the command receive circuit 405 and the command processing circuit 406.

The message generating circuit 407 is one of the characteristic circuits of the present embodiment. When the mode bit 202 in the transfer control information 200 is 1, the message generating circuit 407 reads the user data and the MPI additional information from the local memory 304, based upon the send data address 203 and the send flag address field 204 in the transfer control information 200, respectively. The message generating circuit 407 assembles a message, and delivers it to the message send circuit 408. The header of the message contains information within the transfer control information 200 other than the above-mentioned two addresses. The send data of the message comprises combination of the user data and the additional information as read. When the mode bit 202 is 0, the message generation circuit 407 assembles a message which contains the same header as above and the send data which includes the user data as read.

Figure 5:
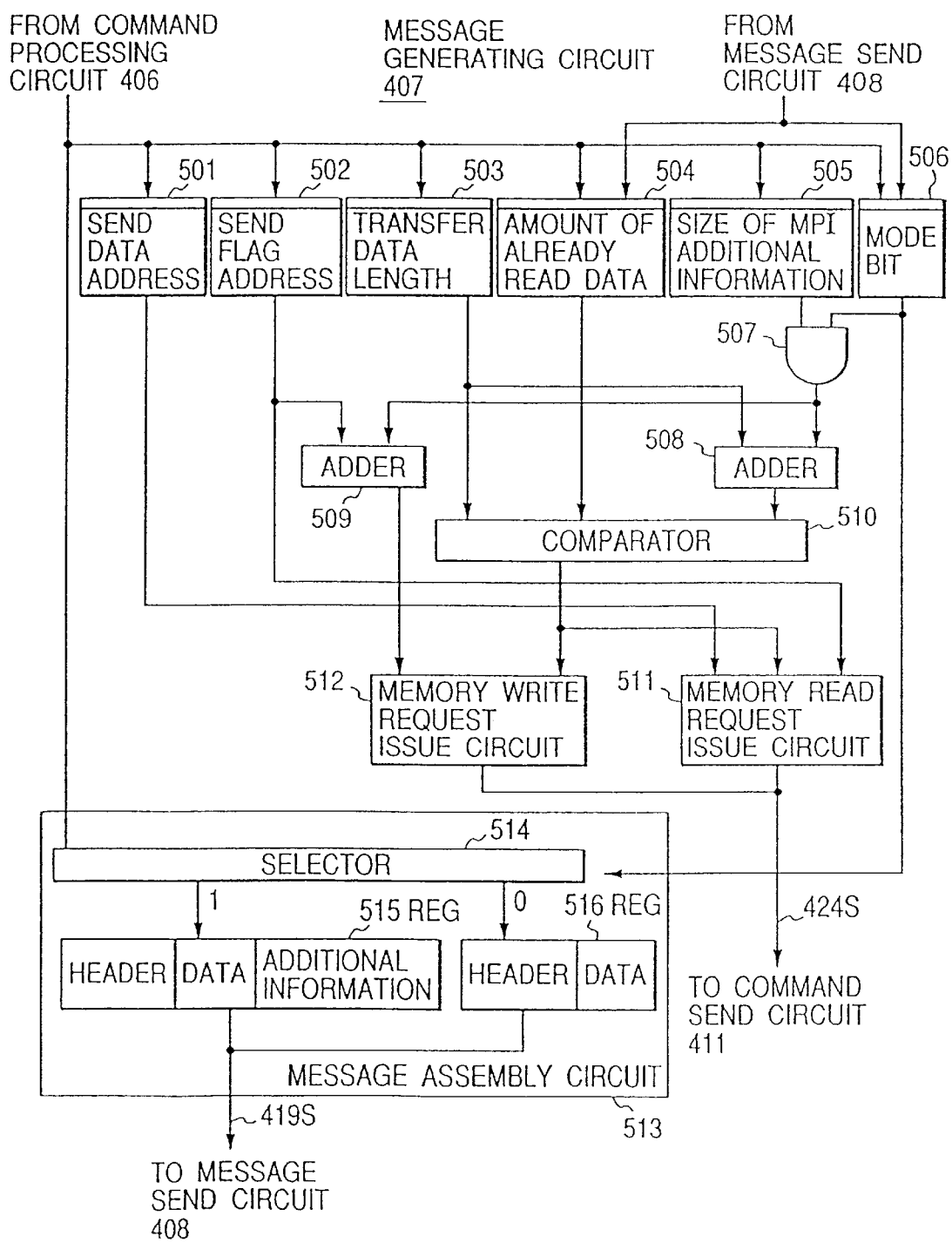
FIG. 5 shows a block diagram of the message generating circuit used in the network interface circuit shown in FIG. 4.

FIG. 5 shows internal structure of the message generating circuit 407. The message generating circuit 407 has the registers 501, 502, and 503 which respectively maintain the send data address 203, the address in the send flag address field 204, the transfer data length 205 in the transfer control information 200 read from the local memory 304. The message generating circuit 407 further has a register 504 which holds the amount of data which has already been read from the local memory 304 for a message under generation, a register 505 which holds the size of the MPI additional information and a register 506 which maintains the mode bit 202 in the transfer control information 200. The latter two registers are ones of characteristic circuits of the present embodiment. Access to the local memory 304 is executed by repeating accesses to different data each of a predetermined unit of amount. The amount of already read data as held in the register 504 is counted up whenever the data (the user data and the additional information) to be sent is read from the local memory 304 by predetermined amount, and is reset after all the data to be sent has been transferred to the message send circuit 408. Therefore, the amount of the already read data held in the register 504 can be regarded as total amount of data already sent. Similarly, the send data address held in the register 501 is counted up whenever the data to be sent is read out from the local memory 304 by predetermined amount. The send flag address held in the register 502 is counted up whenever the MPI additional information to be sent is read from the local memory 304 by predetermined amount. The size of the MPI additional information is set into the register 505, when the MPI library and the PUT/GET communication library are initialized by the initialization request issued from a user process. The mode bit 202 in the transfer control information 200 is set into the register 506 when the information is read from the local memory 304, and the mode bit in the register 506 is reset, when all the data is transferred to the message send circuit 408. The message generating circuit 407 includes a memory read request issue circuit 511, a memory write request issue circuit 512, and a message assembly circuit 513. The message generating circuit 407 further includes an AND gate 507, adders 508, 509, and a comparator 510, which are ones of characteristic circuits of the present embodiment. The memory read request issue circuit 511 and circuits connected thereto composes a memory read circuit. The memory write request issue circuit 512 and circuits connected thereto composes a memory write circuit.

The And gate 507 outputs the size of the MPI additional information held in the register 505, in case the mode bit in the register 506 is one, and outputs the value 0 of the mode bit, in case the mode bit is 0. The adder 509 adds the output of the AND gate 507 to the value of the send flag address field 204 held in the register 502. The result of the addition it is stored in the control register (not shown in the drawing) within the memory write request issue circuit (512 (FIG. 5)) at start of the send operation in the element processor of the sending side of the message, and is used later on as the send completion flag address. At send operation in the element processor of the sending side of the message, the head address of the MPI additional information stored in the local memory 304 is included in the send flag address field 204 held the register 502, in case the mode bit is set to 1. The resultant address obtained by the addition indicates the address of the storage location next to the storage region where the MPI additional information is stored, and is used as the write address of the send completion flag at the send operation in the element processor of the sending side of the message. The adder 508 adds the output of the AND gate 507 to the transfer data length held in the register 503. The result of this addition is a sum of the length of the user data and the size of the MPI additional information, in case one is set into the mode bit, and indicates the total amount of data which is to be read from the local memory 304 and to be included in the message to be transferred at the send operation in the element processor of the sending side of the message.

The comparator 510 compares the amount of the already read data as held in the register 504 with each of the transfer data length held in the register 503 and the total amount of the send data outputted from the adder 508. In case the amount of already read data held in the register 504 does not exceed the transfer data length held in the register 503, the comparator 510 outputs a comparison result signal indicative of that to the memory read request issue circuit 511. In case the amount of already read data held in the register 504 exceeds the transfer data length held in the register 503 but not the total amount of data to be read from the local memory 304 as given from the adder 508, the comparator 510 outputs a comparison result signal indicative of that to the memory read request issue circuit 511. When the amount of already read data held in the register 504 has reached the total amount of data to be read, the comparator 510 outputs a comparison result signal indicative of that to the local memory write request issue circuit 512.

The memory read request issue circuit 511 generates a local memory read request, from the comparison result signal from the comparator 510, the send data address in the register 501, and the send flag address in the register 502 and transfers it to the command send circuit 411. That is, the memory read request issue circuit 511 generates a local memory read request to read an unread portion of the user data, based on the send data address in the register 501, when the comparison result signal shows that the already read data does not exceed the transfer data length. The memory read request issue circuit 511 generates a local memory read request to read an unread portion of the MPI additional information, based on the send flag address in the register 502, when the total amount of already read data exceeds the transfer data length but not the total amount of the data to be read. The memory read request issue circuit 511 repeats the above-mentioned operation until all of the user data and the MPI additional information are read.

The memory write request issue circuit 512 transfers the local memory write request to the command send circuit 411, based upon the comparison result signal provided from the comparator 510 and the send completion flag address which was outputted from the adder 509 and is stored in the control register (not shown in the drawing), as mentioned before. That is, the memory write request issue circuit 512 generates a write request which requests writing of the send completion flag at a storage location of the send completion flag address given from the control register (not shown), when the comparison result signal shows that the amount of already read data has reached the total amount of data to read.

The message assembly circuit 513 assembles a message having structure decided according to the value of the mode bit and sends a send request of the message to the message send circuit 408. When the mode bit is one, the selector 514 assembles a message which contains a header which contains part of the transfer control information 200 read from the local memory 304 and sent via the command processing circuit 406, and a data portion which contains the user data and the MPI additional information, and sets the assembled message into the register 515. When the mode bit is 0, the selector 514 assembles a message with the header and a data portion including the user data, and sets the message into the register 516. Information other than the send data address 203 and the send flag address 204 are included in the header, among the transfer control information 200 read from the local memory 304.

In FIG. 4, the message send circuit 408 receives the message send request from the message generating circuit 407 and sends the message to the interconnecting network 105 through line 420S. The message is transferred to a destination element processor through the interconnecting network 105 according to the number of the destination processor in the header. The send processing in the message generating circuit 407 is executed to plural message send requests transferred to the network interface circuit 305 sequentially according to the order of arrival of those send requests.

Next, the message receive circuit 409 will be explained. The message receive circuit 409 sequentially receives messages from the interconnecting network 105 by line 421S and transfers them to the message disassembly circuit 410 through line 422S. The message disassembly circuit 410 disassembles the messages into the header portion and the data portion and further separates the user data and the additional information included in the data portion, based upon the transfer data length in the header portion and the predetermined size of the MPI additional information. The transfer length is included in the transfer control information as included in the header portion of the message. The message disassembly circuit 410 transfers write requests to the local memory 304 to write the user data, to write the additional information and to write a receive completion flag to the command send circuit 411 through the request line 423S.

Figure 6:
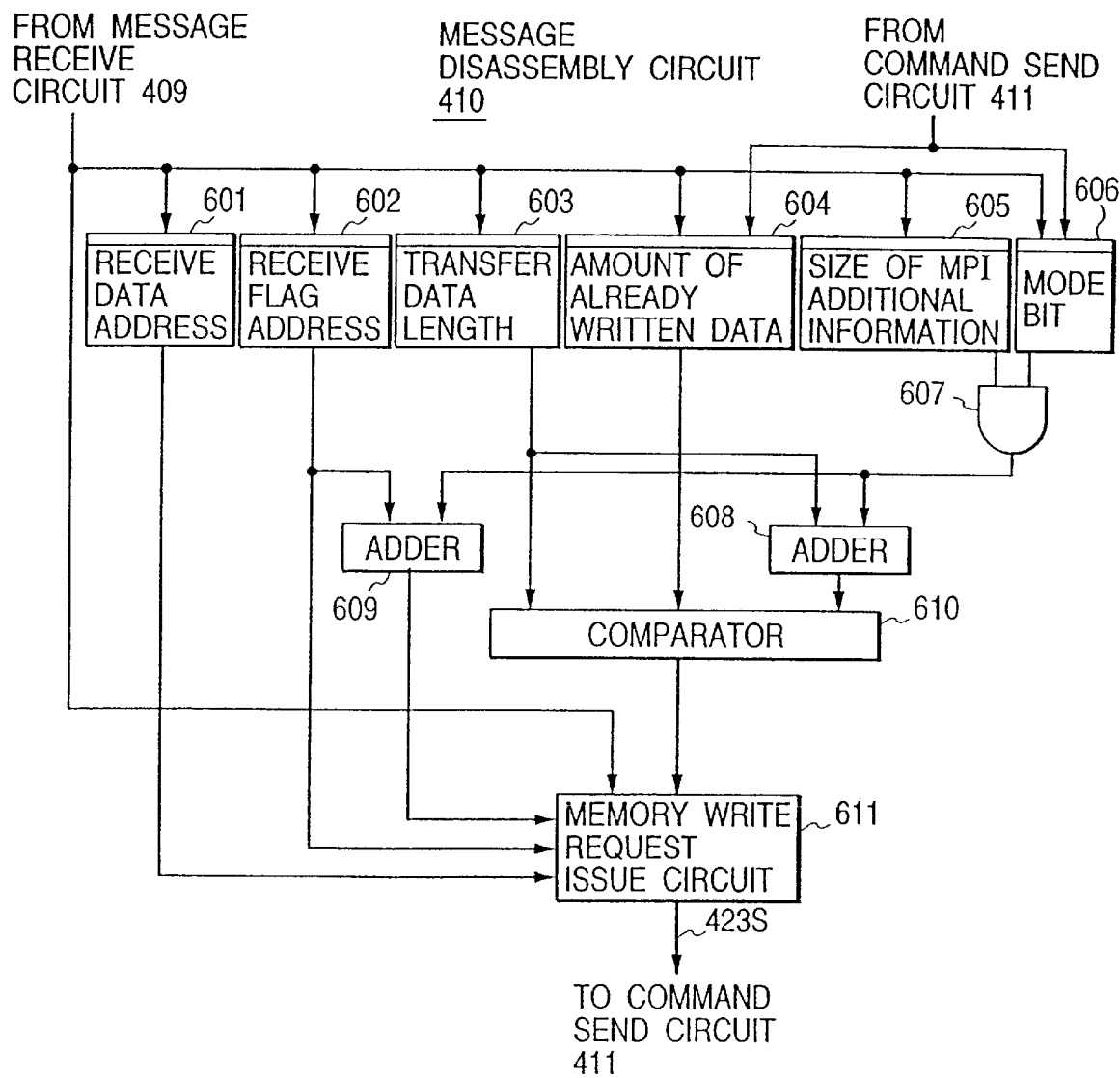
FIG. 6 shows a block diagram of the message disassembly circuit used in the network interface circuit shown in FIG. 4.

FIG. 6 shows internal structure of the message disassembly circuit 410. In the message disassembly circuit 410, the registers 601, 602, 603, and 606 are provided which respectively hold the receive data address, the receive flag address, the transfer data length, and the mode bit in the message header. The register 606 is one of registers characteristic of the present embodiment. The mode bit in the header is set into the register 606 when the header has been received, and the mode bit is reset when all the data in the message has been received. In addition, the registers 604 and 605 are installed in the present embodiment. The register 604 holds the total amount of data already written into the local memory within the data in received the message, and the register 605 holds the size of the MPI additional information. The register 605 is one of registers characteristic to the present embodiment. The predetermined size of the MPI additional information is set into the register 605 at MPI initialization or at job invocation, and this size information is reset when all the data in the message has been received. The amount of the data already written as held in the register 604 is counted up whenever predetermined amount is written into the local memory 304 within the data (the user data and the additional information) in the received message and is reset after all the received data has been written into the local memory 304. Therefore, the total amount of already written data can be regarded as the total amount of already received data. The receive data address in the register 602 is counted up, whenever the user data in the message is written into the local memory 304 by predetermined amount, and similarly the receive flag address in the register 601 is counted up, whenever the MPI additional information in the message is written into the local memory 304 by predetermined amount.

The AND gate 607, the adders 608, 609 and the comparator 610, which are characteristic to the present embodiment, are further installed in the message disassembly circuit 410, in addition to the memory write request issue circuit 611. The And gate 607 outputs the size of the MPI additional information in the register 605 when the mode bit in the register 606 is one, and outputs 0 when the mode bit is 0. The operations of the adders 608 and 609 is similar to the adders 508 and 509 (FIG. 5). The output of the adder 609 represents a receive completion flag address and is stored in the control register (not shown) within the memory write request issue circuit 611 at the start of the receive operation at the element processor of the receiving side. The comparator 610 compares the total amount of already received data as held in the register 604 with each of the transfer data length and the output result data of the adder 608, and outputs the comparison result signal to the memory write request issue circuit 611. That is, the comparator judges whether the total amount of already received data is smaller than the transfer data length, whether the total amount of already received data is larger than the transfer data length and at the same time is smaller than a sum of the transfer data length and the size of the MPI additional information as provided by the AND gate 607, or whether the total amount of already received data is equal to that sum.

The memory write request issue circuit 611 and circuits connected thereto composes the second memory write circuit. Specifically, the memory write request issue circuit 611 generates a local memory write request, based upon the comparison result signal of the comparator 610, the receive data address in the register 601, the receive completion flag address as provided from the adder 609 and already stored in the control register (not shown) within the memory write request issue circuit 611, and the value of the receive flag address field in the register 602, and transfers it to the command send circuit 411 through line 424S. When the mode bit is one, the adder 609 outputs the address obtained by adding the size of the MPI additional information to the value of the receive flag address field in the register 602 as the local memory address of a storage location where the receive completion flag should be written.

When the output of the comparator 610 shows that the total amount of the received data is smaller than the transfer data length, the memory write request issue circuit 611 generates a local memory write request, based on the receive data address in the register 601, to write the received data at a storage location next to the storage locations where already received data has been written.

When the output of the comparator 610 shows that the total amount of the received data is larger than the transfer data length, but is smaller than the sum of the transfer data length and the size of the MPI additional information as provided by the AND gate 607, newly received data belongs to the MPI additional information. Therefore, the memory write request issue circuit 611 generates a local memory write request, based on the address of the receive flag address in the register 602, to write the received data at a storage location next to the storage locations where already received MPI additional information has been written.

When the output of the comparator 610 shows that the total amount of the received data coincides with the sum of the transfer data length and the size of the MPI additional information as provided by the AND gate 607, it means that all data has been received. Therefore, the memory write request issue circuit 611 generates a local memory write request which requests writing of the receive completion flag at a storage location next to the storage locations of the MPI additional information, based on the receive completion flag address as stored in the control register (not shown) within the memory write request issue circuit 611.

The command send circuit 411 writes the received data or the receive completion flag into the local memory 304 according to these write requests. The command send circuit 411 transmits the following data or signals transferred thereto to the data transfer interface circuit 404 in the storage controller 303 through line 413S:

data read from a control register (not shown in the drawings) within the network interface circuit 305, as transferred through line 417S;

a read request to the local memory 304 for the send data used in the message send processing, as transferred through line 424S;

a write request to the local memory 304 for the send completion flag, as transferred through line 424S according to completion of the message send processing;

a write request to the local memory 304 for the receive data or the receive completion flag, as transferred through line 423S according to the message receive processing; and an interrupt request generated in the network interface circuit 305.

Moreover, the command send circuit 411 transmits the read request to the local memory 304 for information related to operation control of the network interface circuit 305 and the read request to the local memory 304 for the transfer control information 200 used in the message send processing, to the data transfer interface circuit 404 through line 413S.

Next, the flow of the message transfer in the present embodiment will be explained. First, the PUT processing will be explained to write the user data and the MPI additional information stored in the local memory of an element processor of the sending side, into the local memory of an element processor of a receiving side, by referring to FIGS. 4, 5, and 7. In the communication method of the present embodiment, the user process of the sending side and the user process of the receiving side issue a command which calls the initialization routine within the MPI library, for instance, MPI_init, they use the MPI library. When the MPI library receives the call to the initialization routine is, it calls some communication preparation procedures in the PUT/GET communication library. These communication preparation procedures are predetermined by the PUT/GET communication library used, but only the processing which relates to the explanation given below or the processing newly executed in the present embodiment will be explained.

Figure 7:
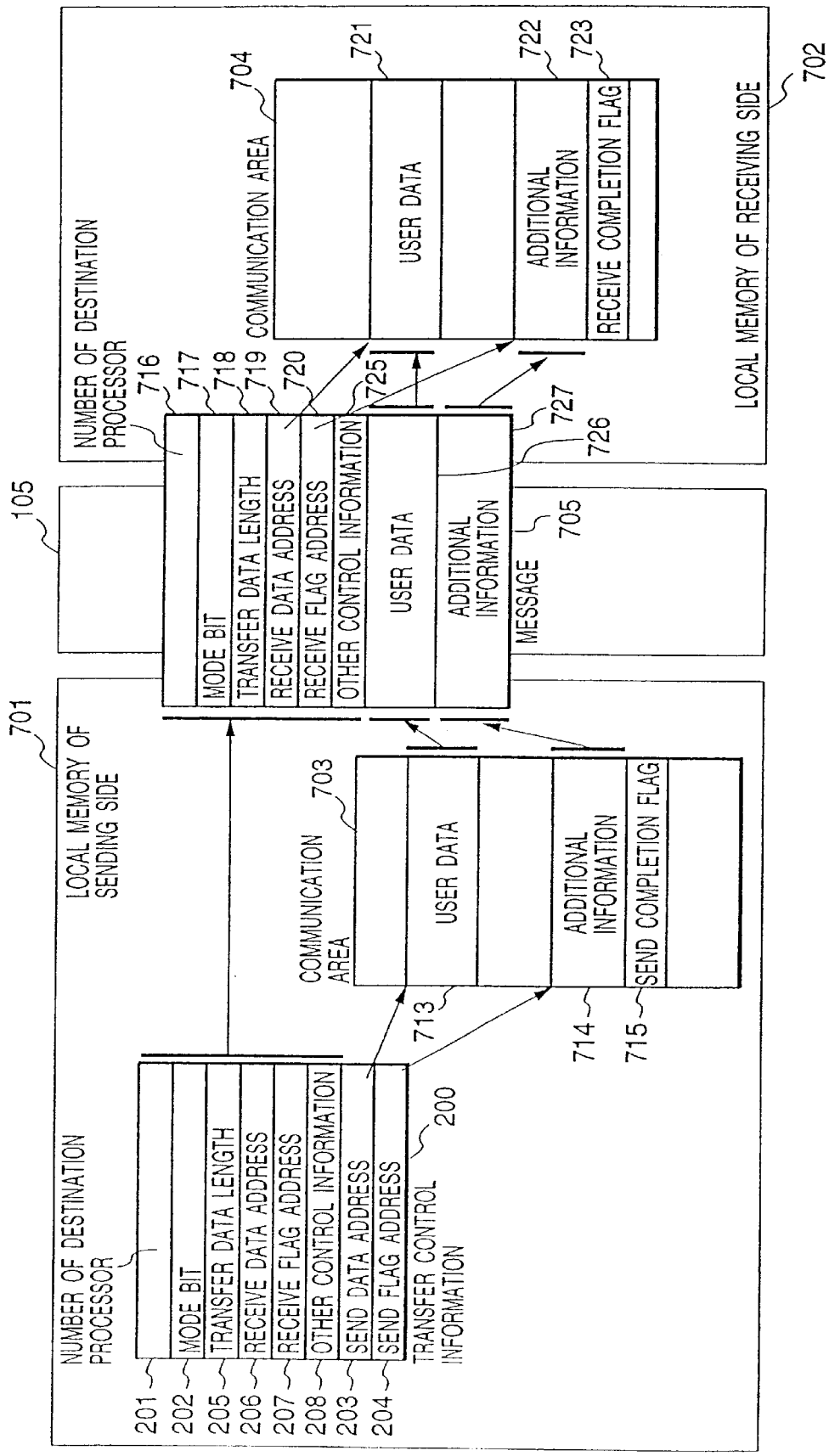
FIG. 7 shows the outline of data transfer processing executed in the apparatus shown in FIG. 1.

Both the PUT/GET communication library of the sending side and the PUT/GET communication library of the receiving side execute the following processing in these communication preparation procedures in the present embodiment. The local memory 701 is mapped into the user space, and the communication regions 703 or 704 (FIG. 7) is secured. The send data region and the send completion flag region corresponding to it are secured in each communication region. In FIG. 7, the reference numeral 713 shows an example of the send data region. In FIG. 7, the send data region in the communication region 704 of the receiving side is not shown. The present embodiment differs from the prior art in that a continuous region which has the size enough to store both the MPI additional information 714 and the send completion flag 715 is secured as the send completion flag region. Similarly, the receive data region and the receive completion flag region are secured in each communication region. The reference numeral 721 in FIG. 7 shows an example of the receive data region in the present embodiment. In FIG. 7, the receive data region in the communication region 703 of the sending side is not shown. The present embodiment differs from the prior art in that a continuous region which has the size enough to store both the MPI additional information 722 and the receive completion flag 723 is secured as the receive completion flag region. The length of the MPI additional information 714 or 722 is about 64 bytes, for instance. The region 715 or 723 where the send completion flag or the receive completion flag is written is eight bytes, for instance. The size of the MPI additional information is set into the registers 505 and 605 during these communication preparation procedures.

There are both a case in which the PUT/GET communication library presumes that the user data is resident in the local memory 701 and a case in which the PUT/GET communication library does not do so. In the former case, the send data region 713 is decided so that the send data region 713 coincides with this resident region of the user data. On the other hand, in the latter case, the send data region 713 is decided independently of the region in the local memory allocated to user data which the user process of the sending side uses. The present invention can be applied to any of the two kinds of PUT/GET communication library. In the latter case, however, it is necessary to copy data in the region of the local memory allocated to user data which the user process uses onto the send data region 713, as will be described later on. In the former case, this copy operation is not necessary, which results in speed up of the data transfer operation.

When the processing of the user process of the sending side advances after the communication preparation procedures are executed as mentioned above, the user process issues a data send request command, for instance, MPI_send to the MPI library of the sending side, after writing data to be transferred into the user data region 713 in the communication region 703 of the sending side. The name of this command is predetermined by the message passing library used and the arguments to be designated by the command comprises plural pieces of information of plural kinds similarly predetermined by the library. The arguments of the command for the MPI library used in the present embodiment comprise a start address of the user data to be transferred, length of the user data, and additional information. The start address is a virtual address of the user data in the virtual memory space allocated to the user process. The additional information contains an identifier of the user process of the receiving side and the identifier of the process group, and so on. The first two arguments are the same as the arguments designated by a data send request command which the user process issue directly to the PUT request/GET communication library so as to request data transfer without using the MPI library. The additional information are arguments which the data transfer request deignates newly to the MPI library.

The MPI library of the sending side responds to the data send request command MPI_send and issues a request the PUT/GET communication library to send data designated by the command. The MPI library of the sending side issues the request in the form of one or plural commands predetermined by the MPI library and the PUT/GET communication library. Only one main command used in the present embodiment among those commands will be explained below.

The MPI library of the sending side issues a command to request acquisition of the transmission right. The put/GET communication library of the sending side responds to this command, communicates with the user process of the receiving side and obtains the transmission right of data to the process. The MPI library of the sending side decides the user process of the receiving side and the number of the element processor which executes it, based upon the process identification number and the process group identification number of the receiving side as included in the additional information designated by the data send request command MPI_send.

The MPI library of the sending side communicates with the user process of the receiving side (substantially, the MPI library of the receiving side) and receives the receive data address and the receive flag address which respectively indicates the head locations of the receive data region and the receive flag region for the user process of the receiving side both controlled by the MPI library of the receiving side. These addresses are real addresses. When the user process of the sending side issues the same data send request command MPI_send later on, the command to request acquisition of the transmission right needs not be executed again.

If the PUT/GET communication library does not presume, as already described, that the user data to be transferred is resident in the local memory 701, the MPI library of the sending side issues a command which requests copying of the user data to be transferred onto the user data region 713. The put/GET communication library of the sending side copies data in a region of the local memory as designated by the command to the user data region 713. The arguments of the command designate the address and the data length of the data to be copied. There may be a case where it is desirable for the MPI library to execute the copy operation directly, but the copy operation is executed in the present embodiment by the PUT/GET communication library in response to a request by the MPI library, as described above. If the PUT/GET communication library presumes that the user data to be transferred is resident in the local memory 701, the copy operation is unnecessary.

Next, the MPI library of the sending side issues a command which requests writing of the additional information into the local memory. The PUT/GET communication library of the sending side responds to this command and writes the MPI additional information designated by the argument of this command into the head region 714 of the send flag region already decided in correspondence to the send data region 713. There may be a case where it is desirable for the MPI library to execute the write operation directly, but the write operation is executed in the present embodiment by the PUT/GET communication library in response to a request by the MPI library, as described above.

The sending side issues a command which requests generation of the transfer control information. The command designates the destination processor number (which is determined by the MPI library based upon the message destination information included in the additional information designated by the MPI_send command), the address of the user region 713 controlled by the MPI library, the address of the region 714 where the additional information is stored, the length of the user data as designated by the MPI command, the addresses of the receive data region 721 and the receive flag region 722 for the process of the receiving side and so on. The PUT/GET communication library of the sending side responds to this command and writes the transfer control information into an appropriate region of the local memory 701. Information included in the transfer control information 200 are as follows. The number of the destination processor 201 is a number of the processor in which the user process of the receiving side is executed. This number is decided in the processing of acquisition of the transmission right, as already described. The mode bit 202 is a bit which shows whether use of the send flag address field 204 is expanded according to the present embodiment. The put/GET communication library of the sending side sets the mode bit to one, when data transfer is requested by the MPI library of the sending side. The value 1 of the mode bit 202 requests transfer of the user data and the MPI additional information in one message. In case, the user process of the sending side issues the data send request command directly to the PUT/GET communication library and not to the MPI library in the present embodiment, the PUT/GET communication library responses to the command and generates the transfer control information which has the same structure as the transfer control information 200 shown in FIG. 7 and in which the value of the mode bit 202 is 0. Various addresses included in the transfer control information are real addresses.

The send data address 203 is the start address of the send data region 713 which stores the user data or its copy transfer of which has been requested by the user process of the sending side. The transfer data length 205 is the data length of the user data which the data send request command MPI_send designates, and the MPI library which has received the command notifies the PUT/GET communication library of the length.

In the conventional apparatus, the local memory address to write the send completion flag is stored in the send flag address field 204, the start address of the MPI additional information 714 in the local memory 701 is stored in the send flag address field 204 when the mode bit 202 is one in the present embodiment. It means that the address of the region 715 in the local memory which stores the send completion flag will not be designated explicitly by the send flag address field 204, when the mode bit 202 is one. In the present embodiment, the network interface circuit 305 stores the send completion flag common to the user data and the MPI additional information, into the region 715 of the next address to the last address of the MPI additional information 714 in the local memory 701. Therefore, the PUT/GET communication library of the sending side notifies the user process of the sending side of send completion when the send completion flag is written, as a response to the data send request command from the user process (substantially the MPI library) of the sending side. When the mode bit 202 is 0, the PUT/GET communication library sets into the send flag address field 204, the address where the send completion flag is to be written as decided by the library.

The receive data address 206 is the address of the local memory region 721 (FIG. 7) to store the received data in the element processor of the receiving side. The receive flag address field 207 is the start address of the region which stores the additional information received with the receive data and the receive completion flag indicative of completion of a receive operation. In the present embodiment, the receive completion flag is written into the region 723 which succeeds to the region 722 where the additional information is stored. Therefore, the start address in the region 722 is written into the receive flag address field 207. Both the receive data address 206 and the receive flag address 207 are notified by the destination PUT/GET communication library in the MPI initialization routine. These addresses are obtained by the MPI library of the sending side after communication with the user process of the receiving side and are included in the arguments of the command which is issued by the MPI library and requests generation of the transfer control information. These addresses are used at the receive operation in the processor element of the receiving side.

The other control information 208 contains other information necessary for communication processing, such as one indicating a type of PUT message, GET message or GET request message or one indicating a type of communication like one to one communication or multicast communication and so on.

In the transfer control information 200, it is possible to install the field which designates separately the local memory address where the MPI additional information should be read and the field which designates the local memory address where received the MPI additional information should be written. However, the switching of two addresses which the send flag address 204 and the receive flag address 207 designate by using the mode bit 202 as in the present embodiment has an advantage that the structure and the size of the transfer control information 200 can be the same as the case where the user process uses only the PUT/GET communication library to transfer or to receive data.

When the transfer control information 200 has been generated, the MPI library of the sending side issues to the network interface circuit 305, a command which requests transferring of data according to the generated transfer control information. The PUT/GET communication library responds to this command and issues a write command which request writing of the start addresses of the transfer control information 200 into a message transfer activation register (not shown in the drawings) as provided in the network interface circuit 305. The command processing circuit 406 executes the write command and writes the start address of the transfer control information 200 into the message transfer activation register (not shown in the drawings) within the network interface circuit 305. The network interface circuit 305 starts message send processing by this writing.

As shown in FIG. 4, the command processing circuit 406 transmits a local memory access request which reads the transfer control information 200 stored in the local memory 304 to the command send circuit 411 through line 417S, to make the header of the message. The transfer control information 200 as read from the local memory 304 based on the address written into the message transfer activation register (not shown in the drawings) is transmitted through line 413S, the data transfer interface circuit 404, line 410S, and the memory access interface circuit 403 and is further transferred to the message generating circuit 407 through the memory access interface circuit 403, line 411S, the data transfer interface circuit 404, line 412S, and the command receive circuit 405, and the command processing circuit 406.

In FIG. 5, the message generating circuit 407 sets the send data address 203, the value of the send flag address field 204, and the transfer data length 205 and the mode bit 202 in the transfer control information 200 into the registers 501, 502, 503, 506, respectively. Other information is held in the registers not shown in the drawing. The mode bit in the register 506 is one in the present case. The mode bit in the register 506 is 1, so the AND gate 507 is turned on and outputs the size of the MPI additional information in the register 505. The adder 508 adds the transfer data length in the register 503 to the MPI additional information outputted from the AND gate 507, and outputs total amount of data to be read from the local memory 701. When the comparator 510 judges that the total amount of already read data as held in the register 504 is smaller than the transfer data length held in the register 503, the memory read request issue circuit 511 transmits a local memory read request to the command send circuit 411 to read the user data 713 from the storage location of the send data address held in the register 501. The user data is read from the local memory 701 through the command send circuit 411 and the memory access interface circuit 403 in the storage controller 303. The read data is transferred to the command processing circuit 406 through the memory access interface circuit 403 in the storage controller 303, the data transfer interface circuit 404, and the command receive circuit 405, and is further transferred to the message generating circuit 407 through line 418S.

When the comparator 510 judges that the total amount of already read data as held in the register 504 is larger than the transfer data length held in the register 503 but is not greater than a sum of the transfer data length and the size of the MPI additional information held in the register 505, the memory read request issue circuit 511 transmits a local memory read request to the command send circuit 411, to read the MPI additional information 714 from a storage location in the local memory 701 which has the send flag address held in the register 502. The read request is sent from the command send circuit 411 to the local memory 701 through the data transfer interface circuit 404 and the memory access interface circuit 403 in the storage controller 303. The MPI additional information 714 is read from the local memory 701. The MPI additional information 714 is transferred to the command processing circuit 406 through the memory access interface circuit 403, the data transfer interface circuit 404, and the command receive circuit 405 in the storage controller 303 and is further transferred to the message generating circuit 407 through line 418S.

The selector 514 in the message assembly circuit 513 in the message generating circuit 407 receives the mode bit is as a control signal. As the mod is one, the selector stores the part of the transfer control information 200 read from the local memory 304 other than the send data address and the send flag address into the header portion in the register 515. Similarly, the selector 514 stores the user data 713 and the MPI additional information 714 into the data portion of the register 515.

When the comparator 510 judges that the total amount of already read data as held in the register 504 has become equal to the sum of the transfer data length and the size of the MPI additional information, the memory write request issue circuit 512 transmits to the command send circuit 411, a local memory write request which requests writing of the send completion flag. The request requests writing of the flag into a storage location of an address equal to the sum of the start address of the MPI additional information as held in the send flag address field in the register 602 and the size of the MPI additional information in the register 505. The sum is already provided by the adder 509 and is already stored in the control register (not shown) within the memory write request issue circuit 611, as was explained before. The send completion flag 715 is written into the local memory 304 from the command send circuit 411 through the memory access interface circuit 403 in the storage controller 303. In the present embodiment, completion of reading of the user data and the MPI additional information which the message should include is regarded as completion of transfer of the message, and the send completion flag 715 is written at completion of the reading. The flag, however, may be written when the message has been transferred to the interconnecting network 105.

Thus, one message 705 which contains the user data and the MPI additional information which relates to it is generated within the register 515. The message 705 includes the number of the destination processor 716, the mode bit 717, the transfer data length 718, the receive data address 719, the receive flag address 720, and the other control information 725 all included in the transfer control information 200, and further includes the user data 726 and the additional information 727 in place of the send data address 203 and the send flag address 204 included in the transfer control information 200. The message generating circuit 407 transfers the message 705 to the message send circuit 408. When the message generating circuit 407 finishes sending the message 705 to the message send circuit 408, the message send circuit 408 resets the register 504 and 506. The message send circuit 408 sends the message 705 to the interconnecting network 105. The interconnecting network 105 transfers the message to a processor designated by the number of the destination processor 716 in the message.

Next, the receive processing will be explained. The message 705 transferred from the interconnecting network 105 is received by the message receive circuit 409 and is transferred to the message disassembly circuit 410. The message disassembly circuit 410 writes the receive data address 719, the receive flag address 720, the transfer data length 718, and the mode bit 717 included in the message header into the register 601, 602, 603, and 606 (FIG. 6), respectively. The register 604 is reset to 0 beforehand and the size of the MPI additional information is set into the register 605 beforehand. The memory write request issue circuit 611 in the message disassembly circuit 410 generates a local memory access request to write the received user data into the local memory region designated by the receive data address 719 in the header, and transfers it to the command send circuit 411 through line 423S. The received user data is written into the region 721 in the communication region 704 of the local memory 304 according to the receive data address 719 in the message header, by way of the memory access interface circuit 403 within the storage controller 303. The mode bit in the register 606 is 1, so the AND gate 607 is turned on and supplies the size of the MPI additional information held in the register 605 to the adder 608. The adder 608 adds the transfer data length 607 in the register 603 to the size of the MPI additional information provided from the AND gate 607, and supplies total amount of data to be written into the local memory. Whenever the message receive circuit 409 receives one of different portions of the user data in the message from the interconnecting network 105, the amount of the received data held in the register 604 is updated.

Whenever a different portion of the user data is received by the message receive circuit 409, the comparator 610 in the message disassembly circuit 410 judges whether the total amount of received data as held in the register 604 is smaller than the transfer data length held in the register 603. When the comparator 610 judges that the former is smaller than the latter, the memory write request issue circuit 611 requests the command send circuit 411 to write the received user data into the local memory 702 of the receiving side according to the receive data address held in the register 601.

When the comparator 610 judges that the total amount of already read data as held in the register 604 is larger than the transfer data length held in the register 503 but is not greater than a sum of the transfer data length and the size of the MPI additional information held in the register 605, the memory read request issue circuit 611 transmits to the command send circuit 411, a local memory write request which requests writing of the received MPI additional information into a storage location of the local memory 701 which has an address included in the receive flag address field as held in the register 602.

As already mentioned, the adder 609 adds the value of the receive flag address field in the register 602 to the size of the MPI additional information given from the AND gate 607, and decides a memory address at which the receive completion flag should be written. The output of the adder 609 was already stored in the control register (not shown) within the memory write request issue circuit 611 at start of the receive operation in the element processor of the receiving side. When the comparator 610 detects that the amount of already receives data as held in the register 604 has become equal to a sum of the transfer data length and the size of the MPI additional information, as given from the adder 608, the memory write request issue circuit 611 transmits to the command send circuit 411, a local memory write request which requests writing of the receive completion flag at the receive completion flag address given by the control register (not shown) within the memory write request issue circuit 611. As a result, the receive completion flag 723 is written into the local memory 304 from the command send circuit 411 through the memory access interface circuit 403 in the storage controller 303. Thus, the data receive processing is completed. Moreover, the data transfer processing ends at completion of the data receive processing.

The received user data and additional information are used in the element processor of the receiving side in the following manner. The user process of the receiving side issues a command which requests receiving of data transferred from another element processor, MPI_recv, for instance. This command designates arguments which include an address indicative of user data to be received, the maximum length of the user data and the additional information predetermined by the MPI library. The additional information includes an identifier of the user process of the sending side and other information. The address designated by this command is a virtual address which belongs to the address space allocated to the user process of the receiving side. The MPI library of the receiving side judges, based on the additional information 722, and the receive completion flag 723 written in the local memory 702, whether the user data as designated by the argument of this receive command has been written into the local memory 702. The MPI library detects a valid receive completion flag 723, and compares the additional information 722 corresponding to the flag with the additional information designated by the MPI_recv command. If coincidence is detected with respect to necessary information as determined by the MPI library, the MPI library judges that the user data is already written. If the user data has been written into the local memory 702, the MPI library of the receiving side notifies the user process of the receiving side of completion of receipt of the user data. If the user data has not been written into the local memory 702 yet, the MPI library repeats the judgement until the judgement succeeds.

If data region which has the virtual address designated by the user process of the receiving side is not resident in the local memory 702, the MPI library of the receiving side copies the received user data 721 onto a local memory region allocated to the address which the user process designates, before executing the notifying operation. If data region which has the virtual address designated by the user process of the receiving side is resident in the local memory 702, the copy operation is unnecessary.

The user process of the receiving side executes an instruction to read the received data, when the user process receives the notification of the receive completion. Therefore, the receive processing of the user data in the receiving side differs from the prior art in that the common receive completion flag 723 is used to detect whether the user data 721 and the additional information 722 has been written into the local memory 702.

The explanation given above is about the case where the user process has issued a send request command of data to the MPI library. In the present embodiment a user process can issue a data send request command to the PUT/GET communication library directly. In this case, the data send request command designates the virtual address indicative of the user data to be transferred, the data length, the destination element processor, the send data address and so on to the PUT/GET communication library. The PUT/GET communication library responds to this command, generates the transfer control information 200 which has the same structure as one described above and writes it into the local memory 701. The value of the mode bit 202 in this information is 0. The send flag address field 204 designates the address of a write region 715 of the send completion flag. It is the same with the receive flag address field 207. The additional information storage regions 714, 722 are unnecessary for the data send request command. The addresses such as the send data address are all real addresses as in the case of the transfer control information generated by the instruction from the MPI library.

When the mode bit 202 in the transfer control information 200 is 0, the operations of the message generating circuit 407 and the message disassembly circuit 410 differ from the case when the mode bit 202 in the transfer control information 200 is one. That is, as the mode bit in the register 506 is 0, the output of the adder 508 is equal to the transfer data length held in the register 503, and the output of the adder 509 is equal to the send completion flag address held in the register 502. The message generating circuit 407 finishes reading of data to be transferred, when the comparator 510 has detected that the total amount of already read data as held in the register 504 has become equal to the transfer data length held in the register 504 and given from the AND gate 507. When entirety of the message which contains the read out data has been sent to the interconnecting network 105, the memory write request issue circuit 512 in the message generating circuit 407 transmits to the command send circuit 411, a write request which requests writing of the send completion flag into the local memory region designated by the send flag address held in the register 502 and given from the adder 509.

In the element processor of the receiving side, 0 is set into the register 606 (FIG. 6), as the mode bit 717 in the header in the message transferred from the interconnecting network 105 is 0. As the mode bit in the register 606 is 0, the output of the adder 608 is equal to the transfer data length held in the register 603 and the output of the adder 609 is equal to the receive flag address held in the register 602. Therefore, the memory write request issue circuit 611 repeats issuing of a write request which requests writing of the receive data into the local memory until the comparator 610 detects that the total amount of received data as held in the register 604 has become equal to the transfer data length as provided by the adder 608. After all the receive data has been written into the local memory, the memory write request issue circuit 611 issues a write request to write the receive completion flag into the local memory 304 according to the receive flag address held in the register 602 and provided from the adder 609. Thus, the data transfer requested by the MPI library ends.

Figure 8:
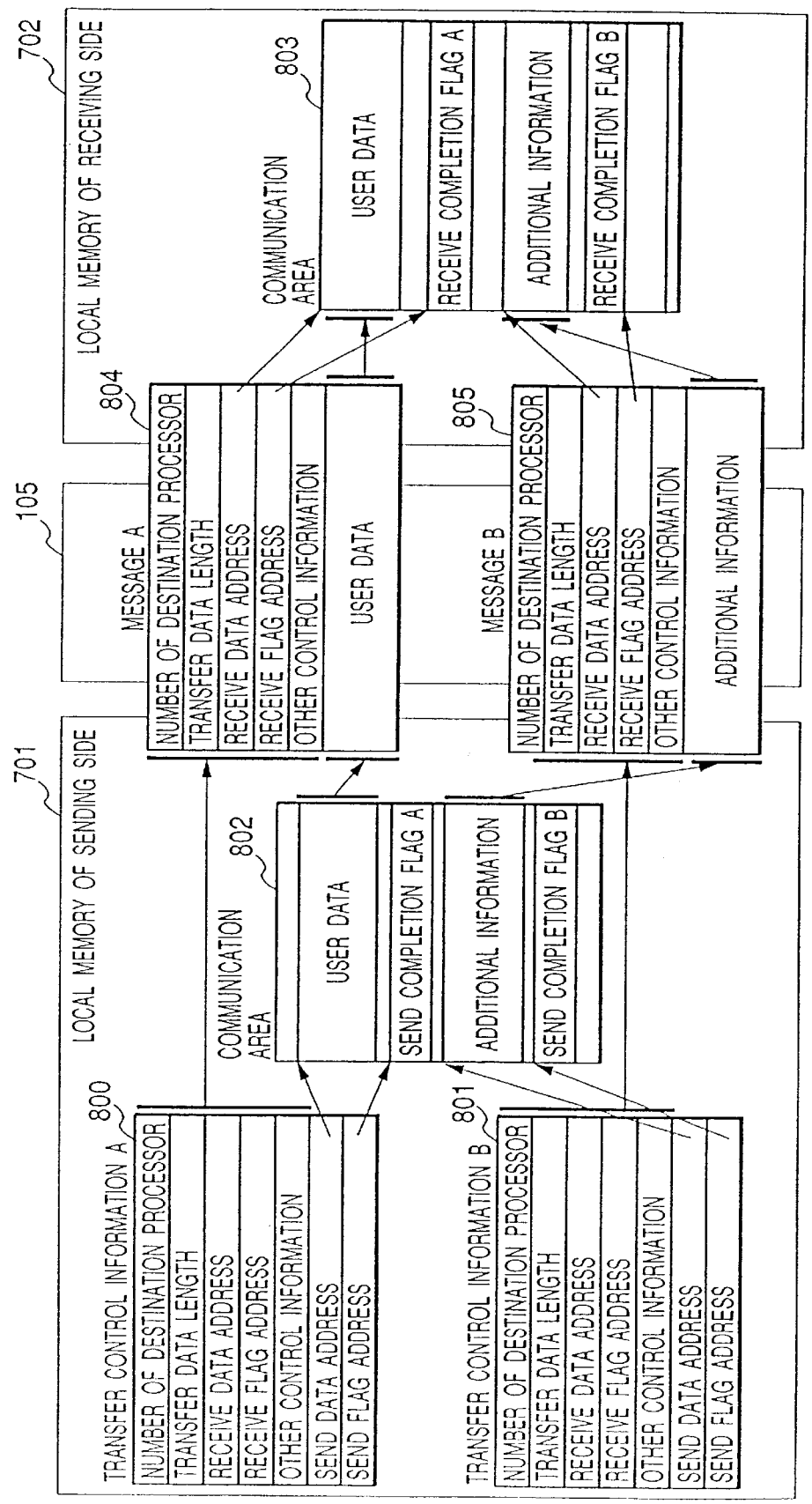
FIG. 8 shows the outline of the prior art data transfer processing.

For the comparison, in the prior art PUT processing, as shown in FIG. 8, the PUT/GET communication library of the sending side generates two pieces of transfer control information A and B (800, 801) to transfer the user data and the additional information therefor respectively, and the user data, the send completion flag A therefor, the additional information, and the send completion flag B therefor are stored in the communication region 802 of the local memory of the sending side. The network interface circuit of the sending side transfers the two messages A and B (804, 805) based on these two pieces of transfer control information. The network interface circuit of the receiving side writes the user data, the receive completion flag A therefor, the additional information, and the receive completion flag B therefor into the communication region 803. The mode bit used in the present embodiment does not exist in the transfer control information A or B.

On the other hand, in the present embodiment, two different data such as the user data and the additional information can be transferred by one message according to the direct inter-memory data transfer method. Therefore, the transfer latency and the local memory access frequency can be reduced and the parallel processing efficiency can be improved, in comparison to the prior art which needs transfer of two messages. In addition, the prior art direct inter-memory data transfer method which does not use the MPI library can be executed.

In addition, the network interface circuit of the sending side uses the send completion flag address to write both the additional information and control information which shows the send completion. So, the amount of information which the PUT/GET communication library should designate for the network interface circuit can be less. Moreover, the network interface circuit in the receiving side uses the receive completion address to write the additional information and control information which shows the receive completion. So, the amount of information included in a PUT message can be less. As a result, the congestion of the network can be prevented, and the transfer time through the network and the receive time in the destination element processor can be shortened. Transfer time of a message can be shortened as a whole. In the prior art method as mentioned above, the network interface circuit 305 needs to access the local memory six times for the send processing of the two different kinds of data (reading of two pieces of transfer control information, reading of two kinds of transfer data, and writing of two flags). The network interface circuit 305 needs to access the local memory four times for the receive processing (writing of two kinds of transfer data, and writing of two flags). In the present embodiment, the total number of accesses to the local memory of the sending side and the total amount of aceses to the local memory of the receiving side are reduced respectively to four times and three times. So, the processing overhead due to the local memory accesses can be reduced.

The PUT processing through the MPI library was explained above but there are other communications such as GET processing in which an element processor of the sending side fetches user data stored in the local memory of the destination element processor. The embodiment can be similarly applied also to the GET processing through the MPI library. That is, the user data and the additional information therefor can be got (transferred) in one message at the same time by using the MPI library together with the PUT/GET library, as will be explained below.

The user process of the request side issues a GET request command to the MPI library. This command designates arguments which are similar to that designated by the send request command explained above in that the arguments include the address of requested data, the data length and the additional information decided by the MPI library and so on. The MPI library, the PUT/GET communication library and the network interface circuit responds to this command, and transfers the GET request message to the destination element processor as in the case of the PUT operation. The send data address for data to be got and the send completion flag for the data are included in the message instead of the receive data address and the receive completion flag address included in the message at the PUT operation, and neither the user data nor the additional information are included. The point where the message is different from the prior art GET request message is to have the mode bit.

The destination element processor reads the user data from the local memory region designated by the data address included in the GET request message, sends back reads the additional information from the local memory region designated by the send completion flag address, and sends back to the processor element of the sending side, the GET message which contains the user data and the additional information. The message contains the receive data address and the receive completion flag. After sending the entirety of the message the interconnecting network, the destination element processor writes the send completion flag at a location in the local memory next to the storage region of the additional information.

The element processor of the sending side receives the GET message, writes the user data in the message into the local memory according to the receive data address in the message, and writes the additional information in the message into the local memory according to the receive completion flag address in the message. After the element processor of the sending side has received all of the user data and the additional information, it writes the receive completion flag into the local memory. The processing overhead due to the local memory access can be reduced by reducing the read frequency of the transfer control information from the local memory and the writing frequency of the flag into the local memory, even in the GET processing as in the PUT processing. Moreover, in the prior art, the user data and the additional information are transferred separately, but they are transferred together in the present embodiment. So, the latency of the data transfer can be reduced.

MODIFICATIONS AND VARIATIONS

The present invention is not limited to the embodiment shown above, but can be realized as various modifications or variations, including the following.

For instance, the extended size field can be installed in the transfer control information stored in the local memory 304. The size of the extended flag region is set into the extended size field. When the mode bit is set, at the send processing, a message is generated which includes part of the transfer control information, data of the transfer data length as read from the local memory region according to the send data address, and another data of the size set in the extended size field as read from the local memory region according to the send flag address, and the message is transferred to the interconnecting network 105. In the receive processing, the message is disassembled into the header part and the data part. The data portion in the message is written by the amount equal to the transfer data length, into the local memory region designated by the receive data address included in the header. Another data portion in the message is written by the amount equal to the size included in the extended size field, into the local memory region designated by the receive flag address included in the header. When the mode bit is not set, the value set into the extended size field is neglected.

According to the data transfer method by the present invention, when the direct inter-memory data transfer is executed through the message passing library like MPI, the user data and the additional information predetermined by the message passing library can be transferred in one message. So, the data transfer processing can be executed at high speed.

Moreover, the computer system according to the present invention has a network interface circuit which can generate one message which contains different data such as user data and additional information as send data, so the computer system is suitable to execute the data transfer method.

What is claimed is:

1. A data transfer method in a computer system which includes a plurality of element processors connected by an interconnecting network, wherein each element processor includes a processor, a memory, and a network interface circuit for exchanging messages with said interconnecting network, wherein each element processor is provided with a message passing library for communicating with user processes running therein and a direct inter-memory data transfer library for communicating with said message passing library and controlling said network interface circuit, said method comprising the steps of:

informing, by said message passing library provided in an element processor of a sending side, first to fourth pieces of address information and data length information, to said direct inter-memory data transfer library provided in said element processor of a sending side, in response to a data send request issued by a user process of a sending side running in said element processor of a sending side;

wherein said user process designates user data and additional information to be transferred and said data length information, said data length information relating to said user data;

wherein said additional information comprises a plurality of pieces of information required at transfer of said user data to a user process of a receiving side running in an element processor of a receiving side;

wherein said first and second pieces of address information designate two storage regions within said memory of said element processor of a sending side where said user data and said additional information are stored;

wherein said third and fourth pieces of address information designate two storage regions within said memory of said element processor of a receiving side where said user data and said additional information are to be stored;

requesting said direct inter-memory data transfer library, by said message passing library, to transfer a message which includes said user data, said additional information, said data length information, and said third to fourth pieces of address information;

requesting said network interface circuit of said element processor of a sending side, by said direct inter-memory data transfer library, to transfer said user data, said additional information, said data length information, and said third and fourth pieces of address information, to said element processor of a receiving side, in response to said requesting by said message passing library;

reading, by said network interface circuit of said element processor of a sending side, said user data and said additional information from said memory of said element processor of a sending side, based on said first and second pieces of address information;

assembling a message, by said network interface circuit of said element processor of a sending side, send data included in said message including said user data and said additional information as read, a header of said message including said third and fourth pieces of address information and said data length information;

transferring, by said network interface circuit, said message to said element processor of a receiving side by way of said interconnecting network; and writing by said network interface circuit in said element processor of said receiving side, said user and said additional information within said message into two storage regions within said memory of said element processor of a receiving side respectively designated by said third and fourth pieces of address information.

2. A data transfer method according to claim 1, further comprising the steps of:

writing by said network interface circuit in said element processor of a sending side after said message has been transmitted, control information indicative of send completion at a storage location in said memory in said element processor of a sending side which is designated by said second piece of address information and has a predetermined relation to one of said two storage regions where said additional information is stored; and writing by said network interface circuit in said element processor of said receiving side after said user data and said additional information within said message has been written into said memory of said element processor of said receiving side, control information indicative of receive completion at a storage location in said memory in said element processor of said receiving side having a predetermined relation to one of said two storage regions which is designated by said fourth piece of address information in said message and where said additional information has been stored.

3. A data transfer method in a computer system which includes a plurality of element processors connected by an interconnecting network, wherein each element processor includes a processor, a memory, and a network interface circuit for exchanging messages with said interconnecting network, wherein each element processor is provided with a message passing library for communicating with user processes running therein and a direct inter-memory data transfer library for communicating with said message passing library and controlling said network interface circuit, said method comprising the steps of:

informing, by said message passing library provided in an element processor of a sending side, first to fourth pieces of address information and data length information, to said direct inter-memory data transfer library provided in said element processor of a sending side, in response to a data send request issued by a user process of a sending side running in said element processor of a sending side;

wherein said user process designates user data and additional information to be transferred and said data length information, said data length information relating to said user data;

wherein said additional information comprises a plurality of pieces of information required at transfer of said user data to a user process of a receiving side running in an element processor of a receiving side;

wherein said first and second pieces of address information designate two storage regions within said memory of said element processor of a sending side where said user data and said additional information are stored;

wherein said third and fourth pieces of address information designate two storage regions within said memory of said element processor of a receiving side where said user data and said additional information are to be stored;

requesting said direct inter-memory data transfer library, by said message passing library, to transfer a message which includes said user data, said additional information, said data length information, and said third to fourth pieces of address information;

requesting said network interface circuit of said element processor of a sending side, by said direct inter-memory data transfer library, to transfer said user data, said additional information, said data length information, and said third and fourth pieces of address information, to said element processor of a receiving side, in response to said requesting by said message passing library;

reading, by said network interface circuit of said element processor of a sending side, said user data and said additional information from said memory of said element processor of a sending side, based on said first and second pieces of address information;

assembling a message, by said network interface circuit of said element processor of a sending side, send data included in said message including said user data and said additional information as read, a header of said message including said third and fourth pieces of address information and said data length information;

transferring, by said network interface circuit, said message to said element processor of a receiving side by way of said interconnecting network; and generating by said direct inter-memory data transfer library provided in said element processor of a sending side, transfer control information which includes said first to fourth pieces of address information and said data length information;

wherein said requesting step executed by said direct inter-memory data transfer library in said element processor of a sending side to said network interface circuit in said element processor of a sending side includes a step of designating said transfer control information.

4. A computer system comprising:

a plurality of element processors; and an interconnecting network for connecting said plurality of element processors;

wherein each element processor includes:
a processor,
a memory, and
a network interface circuit for exchanging messages with said interconnecting network;
wherein said network interface circuit includes:
a memory read circuit connected to said memory, and
a message assembly circuit connected to said memory read circuit for generating a message to be transferred to said interconnecting network;
wherein said memory read circuit reads user data and additional information to be transferred from said memory, respectively based on first and second pieces of address information as designated by said processor;
wherein said message assembly circuit generates a message which includes a header and send data which includes said user data and said additional information;
wherein said header includes third and fourth pieces of address information as designated by said processor which indicates storage regions in said memory in a destination element processor where said user data and additional information within said send data are to be stored, respectively.

5. A computer system comprising:

a plurality of element processors; and an interconnecting network for connecting said plurality of element processors;

wherein each element processor includes:
a processor,
a memory, and
a network interface circuit for exchanging messages with said interconnecting network;
wherein said network interface circuit includes:
a memory read circuit connected to said memory, and
a message assembly circuit connected to said memory read circuit for generating a message to be transferred to said interconnecting network;
wherein said memory read circuit reads user data and additional information to be transferred from said memory, respectively based on first and second pieces of address information as designated by said processor;
wherein said message assembly circuit generates a message which includes a header and send data which includes said user data and said additional information, wherein said processor writes said first to fourth pieces of address information in said memory;
wherein said memory read circuit reads said first and second pieces of address information from said memory;
wherein said memory read circuit uses said first and second pieces of address information as read for readout of said user data and said additional information, respectively; and
wherein said message assembly circuit uses said third and fourth pieces of address information for said header.

6. A computer system according to claim 5, wherein said network interface circuit includes a circuit for writing control information indicative of send completion at a storage location in said memory which has a predetermined relation to a storage region which is designated by said second piece of address information and where said additional information is stored.

7. A computer system according to claim 6, wherein said memory read circuit reads from said memory, transfer control information as having been written into said memory for said message;

wherein said transfer control information includes said first to fourth pieces of address information, data length information related to said first data, and other information;

wherein said memory read circuit uses said first and second pieces of address information and said data length information as included in said transfer control information, for readout of said first and second data;

wherein said memory write circuit uses said second piece of address information to write control information indicative of send completion;

wherein said message assembly circuit uses for said header, said third and fourth pieces of address information, said data length information and said other information as included in said transfer control information.

8. A computer system, according to claim 7, wherein said transfer control information further includes a mode bit;

wherein said memory read circuit executes readout of said user data and said additional information, when said mode bit is of a first value;

wherein said memory read circuit executes readout of said user data and does not reads out said additional information, when said mode bit is of a second value;

wherein said message assembly circuit generates a message send data of which includes said user data and said additional information, when said mode bit is of said first value, and generates a message send data of which includes said first data but not said additional information, when said mode bit is of said second value;

wherein said memory write circuit writes control information indicative of send completion, based on said second piece of address information, at a storage location in said memory which has a predetermined relation to said storage region where said additional information is stored, when said mode hit is of said first value, and at a storage location designated by said second piece of address information, when said mode bit is of said second value.

9. A computer system comprising:

a plurality of element processors; and an interconnecting network for connecting said plurality of element processors;

wherein each element processor includes:
- a processor,
- a memory, and
- a network interface circuit for exchanging messages with said interconnecting network;

wherein said network interface circuit includes:
- a memory read circuit connected to said memory, and
- a message assembly circuit connected to said memory read circuit for generating a message to be transferred to said interconnecting network;

wherein said memory read circuit reads user data and additional information to be transferred from said memory, respectively based on first and second pieces of address information as designated by said processor;

wherein said message assembly circuit generates a message which includes a header and send data which includes said user data and said additional information, wherein said network interface circuit further includes:
- a receive circuit for receiving a message transferred from another element processor by way of said interconnecting network, and
- another memory write circuit;

wherein send data in said received message includes another user data and another additional information, and a header in said received message includes another third piece of address information and another fourth piece of address information; and wherein said another memory write circuit writes said another first data within said received message into said memory, based on said another third piece of address information within said received message, and writes said another additional within said received message into said memory, based on said another fourth piece of address information included in said received message.

10. A computer system according to claim 9, wherein said another memory write circuit writes control information indicative of receive completion of said another user data after writing said another user data and said another user within said received message into said memory, at a storage location within said memory having a predetermined relation to a storage region which is designated by said another fourth piece of address information within said received message and where said received another user has been stored.

11. A computer system according to claim 10, wherein said received message further includes a mode bit;

wherein said another memory write circuit executes the following write operations when said mode bit is of a first value:
- (a) a write operation to write said another user data and said another additional information within said received message into said memory, respectively based upon said another third and another fourth pieces of address information included in said received message, and
- (b) a write operation to write, after said another user data and said another second data within said received message have been written, control information indicative of receive completion at a storage location in said memory which has a predetermined relation to a storage region which is designated by said another fourth piece of address information and where said another additional information has been stored;

wherein said another memory write circuit executes the following write operations when said mode bit is of a second value:
- (a) a write operation to write said another user data within said received message into said memory, based upon said another third piece of address information included in said received message, and
- (b) a write operation to write, after said another user data within said received message has been written, control information indicative of receive completion at a storage location in said memory as designated by said another fourth piece of address information.

12. A computer system , comprising:

a plurality of element processors; and an interconnecting network for connecting said plurality of element processors;

wherein each element processor includes:
- a processor,
- a memory, and
- a network interface circuit for exchanging messages with said interconnecting network;

wherein each element processor is provided with a message passing library for communicating with user processes running therein and a direct inter-memory data transfer library for communicating with said message passing library and controlling said network interface circuit;

wherein said message passing library provided in each element processor is programmed so as to inform first to fourth pieces of address information and data length information, to said direct inter-memory data transfer library provided in said each element processor, in response to a data send request issued by a user process of a sending side running in said each element processor;

wherein said user process designates user data and additional information to be transferred and said data length information, said data length information relating to said user data;

wherein said additional information comprises a plurality of pieces of information required at transfer of said user data to a user process of a receiving side running in an element processor of a receiving side;

wherein said first and second pieces of address information designate two storage regions within said memory of said element processor of a sending side where said user data and said additional information are stored;

wherein said third and fourth pieces of address information designate two storage regions within said memory of said element processor of a receiving side where said user data and said additional information are to be stored;

wherein said message passing library provided in said each element processor is further programmed so as to request said direct inter-memory data transfer library to transfer a message which includes said user data, said additional information, said data length information, and said third to fourth pieces of address information;

wherein said direct inter-memory data transfer library provided in said each element processor is programmed so as to request said network interface circuit of said element processor to transfer said user data, said additional information, said data length information, and said third and fourth pieces of address information, to said element processor of a receiving side, in response to said requesting by said message passing library;

wherein said network interface circuit includes:
- a memory read circuit for reading said user data and said additional information from said memory of said each element processor, based on said first and second pieces of address information,
- a message assembly circuit for assembling a message, send data included in said message including said user data and said additional information, a header included in said message including said other information and said data length information, and
- a message transmit circuit for transferring said message to said element processor of a receiving side by way of said interconnecting network;

wherein said network interface circuit further includes:
- a message receive circuit for receiving from another element processor, a message which includes user data, additional information, and another third and fourth pieces of address information;
- wherein said network interface circuit in said each element processor further includes a memory write circuit for writing said user data and said additional information included in said received message into two storage regions respectively designated by said another third and another fourth pieces of address information included in said received message.

13. A computer system according to claim 12, wherein said network interface circuit in said each element processor further includes:

another memory write circuit for writing, after said message has been transmitted, control information indicative of send completion at a storage location in said memory in said each element processor which has a predetermined relation to one of said two storage regions which is designated by said second piece of address information and where said additional information is stored; and a further another memory write circuit for writing, after writing by said memory write circuit, of said user data and said additional information included in said received message, control information indicative of receive at a storage location in said memory in said each element processor which has a predetermined relation to one of said two storage regions which is designated by said another fourth piece of address information and where said received additional information is stored.

* * * * *